US012689257B2

(12) United States Patent
Yasuda

(10) Patent No.: US 12,689,257 B2
(45) Date of Patent: Jul. 21, 2026

(54) SEMI-METALLIC GASKET, MOTOR, AND METHOD FOR SEALING MOTOR

(71) Applicant: FANUC CORPORATION, Yamanashi (JP)

(72) Inventor: Ryuya Yasuda, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 295 days.

(21) Appl. No.: 18/560,415

(22) PCT Filed: May 20, 2021

(86) PCT No.: PCT/JP2021/019206
§ 371 (c)(1),
(2) Date: Nov. 13, 2023

(87) PCT Pub. No.: WO2022/244201
PCT Pub. Date: Nov. 24, 2022

(65) Prior Publication Data
US 2024/0258866 A1 Aug. 1, 2024

(51) Int. Cl.
H02K 5/10 (2006.01)
H02K 1/18 (2006.01)

(52) U.S. Cl.
CPC ................. H02K 5/10 (2013.01); H02K 1/18 (2013.01)

(58) Field of Classification Search
CPC ................................... H02K 5/10; H02K 1/18
USPC .......................................................... 310/88
See application file for complete search history.

(56) References Cited

U.S. PATENT DOCUMENTS

| | | | | |
|---|---|---|---|---|
| 10,520,088 | B2 * | 12/2019 | Watanabe | F16J 15/0818 |
| 10,673,298 | B2 * | 6/2020 | Yukawa | H02K 1/185 |
| 11,248,704 | B2 * | 2/2022 | Tanji | F16J 15/0818 |
| 2004/0036233 | A1 | 2/2004 | Schleth et al. | |
| 2005/0162026 | A1 * | 7/2005 | McCain | H02K 5/10 |
| | | | | 310/88 |
| 2008/0246232 | A1 | 10/2008 | Takahashi et al. | |
| 2008/0284112 | A1 * | 11/2008 | Koch | F16J 15/104 |
| | | | | 277/590 |

(Continued)

FOREIGN PATENT DOCUMENTS

| | | |
|---|---|---|
| JP | H10118857 A | 5/1998 |
| JP | 2002005291 A | 1/2002 |

(Continued)

OTHER PUBLICATIONS

Office Action dated Jul. 8, 2025 issued in corresponding Japanese Patent application No. 2023-522131 (5pages). pages, no translation available.

(Continued)

*Primary Examiner* — Burton S Mullins
(74) *Attorney, Agent, or Firm* — CARTER, DELUCA & FARRELL LLP

(57) ABSTRACT
A motor including a first member and a second member each having an annular shaped cross-section, a semi-metallic gasket for sealing between the first member and the second member, and a method for sealing the motor using the semi-metallic gasket. The semi-metallic gasket includes an annular shaped bead portion and portions to be sucked by a suction hand. The portions to be sucked project from the bead portion along the wall width direction of the bead portion.

4 Claims, 7 Drawing Sheets

(56)         References Cited

U.S. PATENT DOCUMENTS

| 2013/0048102 | A1* | 2/2013 | Hagita ................ F04B 39/0027 |
| | | | 137/343 |
| 2016/0248292 | A1* | 8/2016 | Takarai .................. H05K 5/061 |
| 2021/0099056 | A1* | 4/2021 | Fukuda .................. H02K 1/185 |

FOREIGN PATENT DOCUMENTS

| JP | 2002295648 | A | 10/2002 |
| JP | 2008167609 | A | 7/2008 |
| JP | 2010074990 | A | 4/2010 |
| JP | 2010525269 | A | 7/2010 |
| JP | 2013076352 | A | 4/2013 |
| JP | 2013207815 | A | 10/2013 |
| JP | 2014231868 | A | 12/2014 |
| JP | 2016032332 | A | 3/2016 |
| JP | 2016142387 | A | 8/2016 |
| JP | 2018055763 | A | 4/2018 |

OTHER PUBLICATIONS

International Search Report issued by the Japan Patent Office acting as the International Searching Authority in relation to International Application No. PCT/JP2021/019206 dated Jul. 6, 2021 (4 pages) along with English language translation (3 pages).
Written Opinion of the International Searching Authority issued by the Japan Patent Office acting as the International Searching Authority in relation to International Application No. PCT/JP2021/019206 dated Jul. 6, 2021 (5 pages).
Office Action dated Apr. 18, 2026 issued in corresponding Chinese Patent Application No. 202180098152.8 (8 pages).

* cited by examiner

FIG. 1

SEMI-METALLIC GASKET, MOTOR, AND METHOD FOR SEALING MOTOR

CROSS-REFERENCE TO RELATED APPLICATIONS

This application is a national phase entry under 35 U.S.C. 371 of PCT International Application No. PCT/JP2021/019206, filed May 20, 2021, the disclosure of this application is expressly incorporated herein by reference in its entirety.

TECHNICAL FIELD

The present invention relates to a semi-metallic gasket for a motor, a motor provided with the semi-metallic gasket, and a method for sealing a motor (motor sealing method) using the semi-metallic gasket.

BACKGROUND ART

In JP 2013-207815 A, a semi-metallic gasket is disclosed that seals a gap between two case members provided in a motor. Such a semi-metallic gasket includes a metal base material and a resin material (rubber material). The metal base material is a thin plate of a metal material. The resin material serves to coat the metal base material.

SUMMARY OF THE INVENTION

A width of the semi-metallic gasket is preferably as small (narrow) as possible in order to increase the surface pressure that the semi-metallic gasket receives. However, it is difficult for a semi-metallic gasket whose width is small to be held under suction by a suction hand of a robot.

The present invention has the object of solving the problem described above.

A first aspect of the present invention is characterized by a semi-metallic gasket provided in a motor equipped with a first member and a second member each having an annular shaped cross section, the semi-metallic gasket being configured to seal a gap between the first member and the second member, the semi-metallic gasket including a bead portion having an annular shape and made of a semi-metallic material, and a portion to be sucked configured to be held under suction by a suction hand of a robot, wherein the portion to be sucked projects out from the bead portion along a width direction of the bead portion.

A second aspect of the present invention is characterized by a motor in which the semi-metallic gasket according to the first aspect is provided, the motor including the first member and the second member, wherein a gap between the first member and the second member is sealed by the semi-metallic gasket.

A third aspect of the present invention is characterized by a motor sealing method for, by using the semi-metallic gasket according to the first aspect, sealing a gap between the first member and the second member provided in the motor, the motor sealing method including a suction step of holding the portion to be sucked of the semi-metallic gasket, under suction by the section hand, a placement step of placing the semi-metallic gasket held under suction by the suction hand, on the first member of the motor, and a close contact step of bringing the second member of the motor into close contact with the semi-metallic gasket from a side opposite to a side where the first member is disposed.

According to these aspects of the present invention, the semi-metallic gasket is provided which is easily held under suction by the suction hand. In addition, there are further provided the motor in which such a semi-metallic gasket is provided, and the motor sealing method.

BRIEF DESCRIPTION OF DRAWINGS

FIG. 1 is a front view of a semi-metallic gasket according to an embodiment;

DETAILED DESCRIPTION OF THE INVENTION

Embodiment

Figure 1:
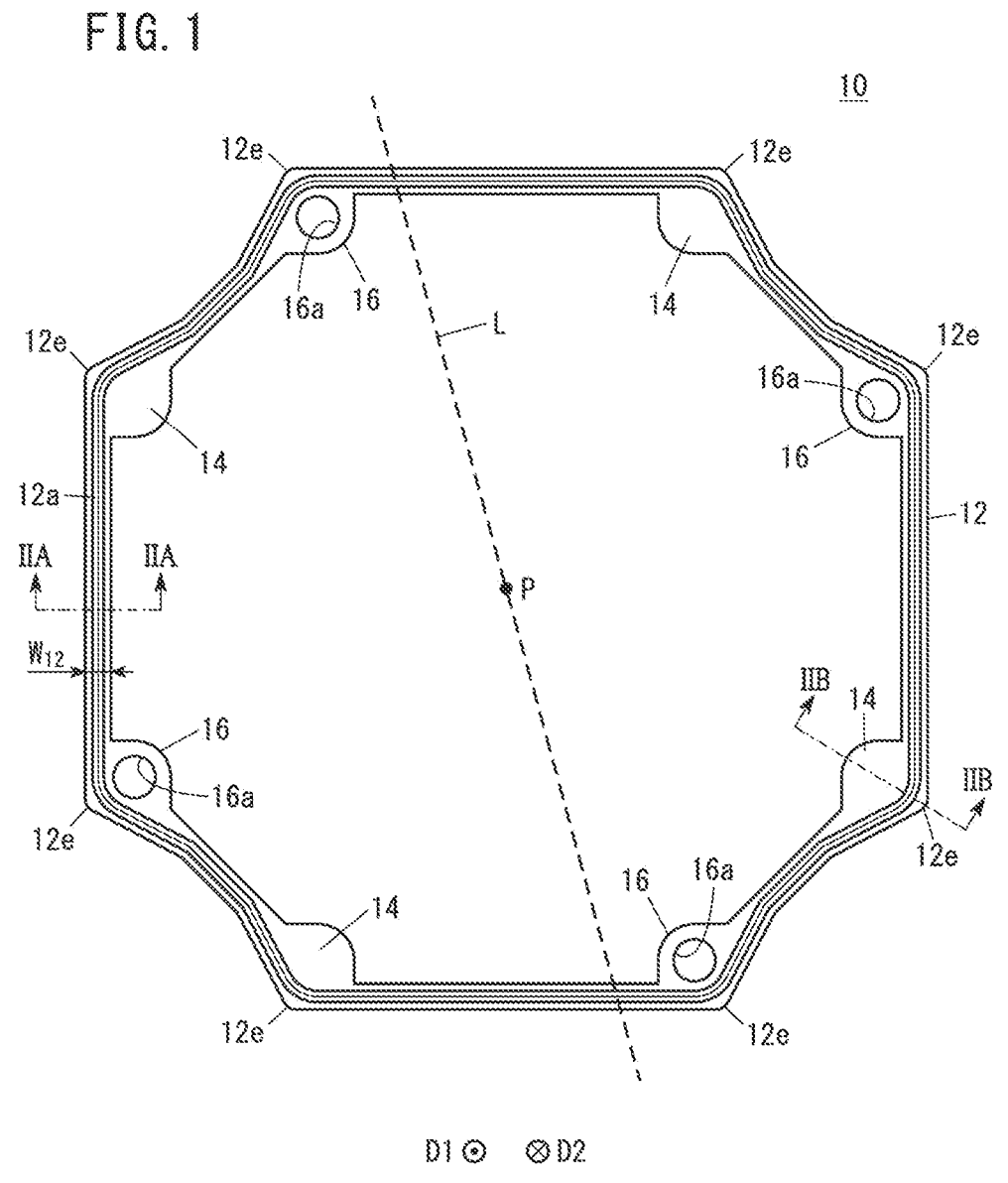
Figures 2A, 2B:
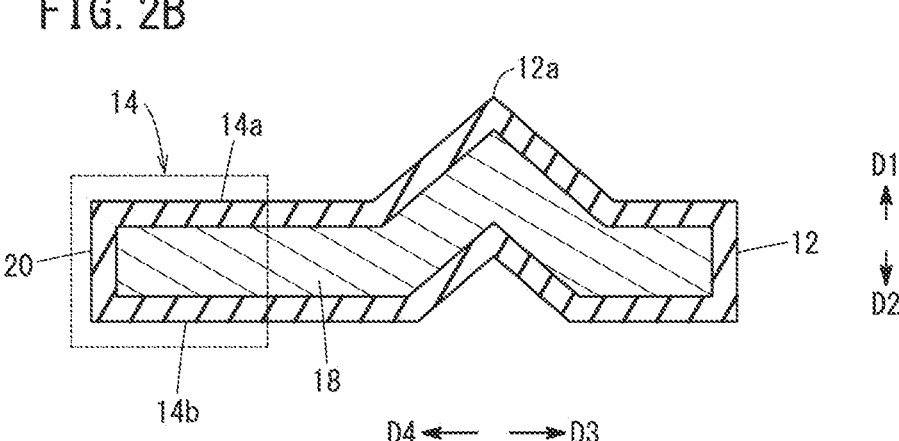
FIG. 2A is an end view taken along line IIA-IIA of FIG. 1.
FIG. 2B is an end view taken along line IIB-IIB of FIG. 1.

FIG. 1 is a front view of a semi-metallic gasket 10 according to an embodiment. Each of a "first direction D1" and a "second direction D2" which are used in the following description are shown in FIG. 1.

The semi-metallic gasket 10 is a sealing member for use in a motor 22. The motor 22 is equipped with a first member (for example, a core block 24 shown in FIG. 3) and a second member (for example, a front side housing 26 shown in FIG. 3). Each of the first member and the second member is a substantially tubular shaped member having an annular shaped cross section (end surface). The first member and the second member are connected to each other in a manner so that respective tubular shaped inner peripheral spaces are continuous with each other. The semi-metallic gaskets 10 seals a gap between the first member and the second member.

The semi-metallic gasket 10 illustrated in FIG. 1 includes a bead portion 12, a plurality of portions to be sucked 14, and a plurality of insertion portions 16.

The bead portion 12 has an annular shape corresponding to the end surface shape (the annular shape) of the first member and the end surface shape (the annular shape) of the second member. For example, each of the core block 24 and the front side housing 26 illustrated in FIG. 3 has a substantially polygonal annular shape (a substantially octagonal annular shape). In this case, as shown in FIG. 1, the bead portion 12 also has a substantially polygonal annular shape (a substantially octagonal annular shape). Moreover, it should be noted, in the case that each of the core block 24 and the front side housing 26 has, for example, a circular annular shape, the bead portion 12 may also have a circular annular shape.

The bead portion 12 receives a pressure (a surface pressure) from each of the first member and the second member. Preferably, the surface pressure is applied to the entirety of the bead portion 12 as uniformly as possible. Accordingly, preferably, the entirety of the bead portion 12 on the side in the first direction D1 is placed in contact with the end surface of the first member. Further, preferably, the entirety of the bead portion 12 on the side in the second direction D2 is placed in contact with the end surface of the second member. In accordance with this feature, the surface pressure is applied to the entirety of the bead portion 12 on the side in the first direction D1 and to the entirety of the bead portion 12 on the side in the second direction D2. Further, preferably, the annular shape of the bead portion 12 is point-symmetrical about a center point P of the annular shape. In accordance with this feature, it becomes easy for the surface pressure to be applied to the bead portion 12 uniformly.

FIG. 2A is an end view taken along line IIA-IIA of FIG. 1.

As shown in FIG. 2A, the bead portion 12 has a metal base material 18 and a resin material 20. The resin material 20 serves to coat the metal base material 18. Further, the resin material 20 possesses elasticity. The resin material 20 that possesses elasticity, for example, is rubber.

In order to increase the airtightness between the first member and the second member, it is preferable for the surface pressure that the bead portion 12 receives from the first member and the second member to be as large as possible. In order to make the surface pressure as great as possible, the bead portion 12 includes a projecting portion (a bead) 12a. The projecting portion 12a projects out in the first direction D1. Further, the projecting portion 12a has an annular shape when viewed from the front (refer to FIG. 1). Such a projecting portion 12a can be easily formed by bending or curving the bead portion 12. At a time when the bead portion 12 is placed in close contact with the second member, the projecting portion 12a is particularly strongly pressed against the second member. Accordingly, the surface pressure that the bead portion 12 receives can be made particularly great at the projecting portion 12a.

Further, if the width $W_{12}$ of the bead portion 12 is made narrow (small), the contact area between the bead portion 12 and the first member can be reduced. Similarly, if the width $W_{12}$ of the bead portion 12 is made narrow (small), the contact area between the bead portion 12 and the second member can be reduced. If the contact area of the bead portion 12 is reduced, the surface pressure that the bead portion 12 receives can be increased accordingly. Accordingly, although it depends on the dimensions of the first member and the second member, preferably, the width $W_{12}$ of the bead portion 12 should be as narrow (small) as possible. Moreover, a width direction of the semi-metallic gasket 10 includes a third direction D3 and a fourth direction D4 as shown in FIG. 2A. Each of the third direction D3 and the fourth direction D4 is perpendicular to the first direction D1 (and the second direction D2). The third direction D3 is a direction from the interior of the annular shape to the exterior of the annular shape of the bead portion 12. The fourth direction D4 is a direction that is opposite to the third direction D3.

Incidentally, by merely pursuing the magnitude of the surface pressure applied to the bead portion 12 in the manner described above, it becomes difficult to automate the operation of assembling the motor. More specifically, in a process of automatically assembling the motor, the robot holds the semi-metallic gasket 10 under suction, with the suction hand. Although the suction hand of the robot is capable of easily holding under suction objects having a flat shape, it is difficult to hold under suction objects having an uneven shape. In this regard, the shape of the bead portion 12 having the projecting portion 12a is an uneven convex/concave shape which is difficult to be held under suction by the suction hand of the robot. Further, in the bead portion 12 the width $W_{12}$ of which is made narrow, it is difficult to secure a contact area with the suction hand. As a result, it becomes difficult to hold the bead portion 12 under suction with the suction hand. If the width $W_{12}$ of the bead portion 12 is less than or equal to one centimeter, the action of holding under suction by the suction hand becomes particularly difficult to perform.

FIG. 2B is an end view taken along line IIB-IIB of FIG. 1.

Thus, the semi-metallic gasket 10 according to the present embodiment includes the portions to be sucked 14 as noted previously. As illustrated in FIG. 2B, each of the plurality of the portions to be sucked 14 is formed by widening the bead portion 12 along the width direction (the fourth direction D4). Each of the plurality of the portions to be sucked 14 includes a surface 14a, and a surface 14b. The surface 14a is a flat surface facing toward the first direction D1. The surface 14b is a flat surface on the rear side of the surface 14a.

Even if the bead portion 12 has a narrow width $W_{12}$, the suction hand is capable of holding, under suction, each of the plurality of the portions to be sucked 14. In addition, each of the plurality of the portions to be sucked 14 has the flat surface 14a (14b). As noted previously, the suction hand easily holds the flat surfaces under suction. Accordingly, the semi-metallic gasket 10 according to the present embodiment is easily held under suction by the suction hand.

As shown in FIG. 1, it is more preferable that at least two portions to be sucked 14 from among the plurality of the portions to be sucked 14 are arranged in a manner so as to sandwich an imaginary straight line L passing through one point on the bead portion 12 and a center point P of the annular shape. In this instance, the imaginary straight line L is an imaginary straight line that passes through one point on the bead portion 12 and the center point P of the annular shape. Consequently, both sides of the semi-metallic gasket 10 sandwiching the imaginary straight line L can be easily held under suction by the suction hand. As a result, it becomes easier to lift up the semi-metallic gasket 10, with the suction hand, in good balance (in a horizontal state). Moreover, it should be noted that the imaginary straight line L is not limited to that which is illustrated in FIG. 1, as long as the line passes through one point on the bead portion 12 and the center point P of the annular shape.

Preferably, the plurality of the portions to be sucked 14 are arranged with point-symmetry about the center point P of the annular shape of the bead portion 12 (refer to FIG. 1). In accordance with this feature, the surface pressure is easily applied uniformly over the entirety of the semi-metallic gasket 10.

Figure 4:
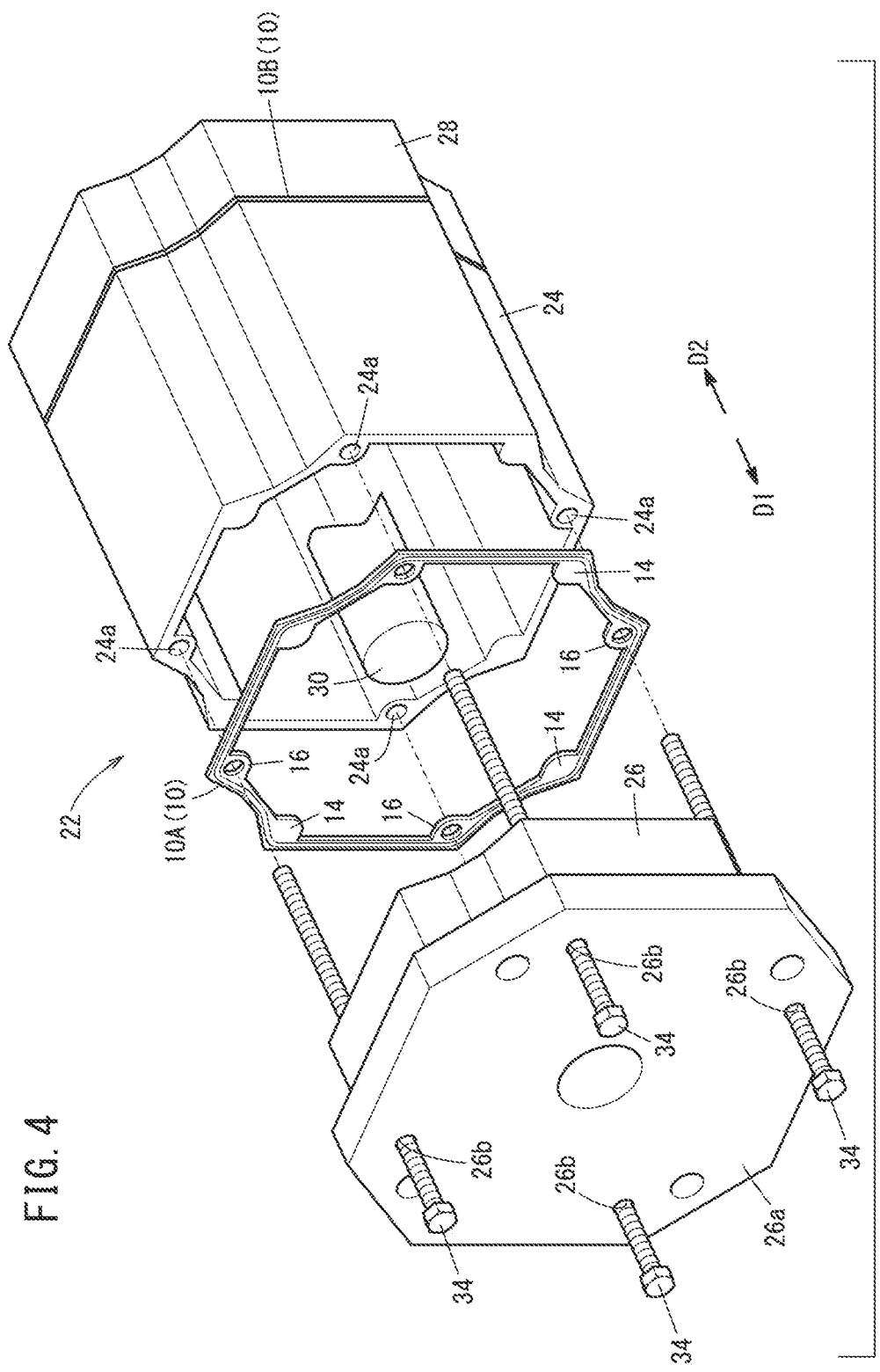
FIG. 4 is an exploded perspective view of the motor shown in FIG. 3.

Each of the plurality of the insertion portions 16 includes a hole 16a therein (a through hole 16a that penetrates in the second direction D2 through the semi-metallic gasket 10). A connecting member is inserted into each of the plurality of the holes 16a. The connecting members are members (for example, screws 34 as shown in FIG. 4) that connect the first member and the second member.

It is more preferable that the plurality of the insertion portions 16 be arranged with point-symmetry about the center point P of the annular shape of the bead portion 12. More specifically, when a tightening force of the screws 34 is increased, each of the first member and the second member is placed in tightly close contact with the semi-metallic gasket 10. As a result thereof, the tightening force of the screws 34 acts particularly strongly around the vicinity of the holes 16a. As a result, in portions around the vicinity of the holes 16a of the semi-metallic gasket 10, the surface pressure becomes larger in comparison to other portions thereof. In this instance, when the plurality of the insertion portions 16 are arranged with point symmetry about the center point P of the annular shape of the bead portion 12, a large surface pressure can be uniformly applied to the entirety of the semi-metallic gasket 10. Moreover, from the standpoint of applying a large surface pressure to the entirety of the semi-metallic gasket 10 in a well-balanced manner, it is more preferable that three or more of the insertion portions 16 be arranged at equal intervals insofar as possible. For example, in the case that the bead portion 12 is of a substantially polygonal annular shape as shown in FIG. 1, the plurality of the insertion portions 16 are preferably arranged at corner parts 12e of the bead portion 12.

Figure 3:
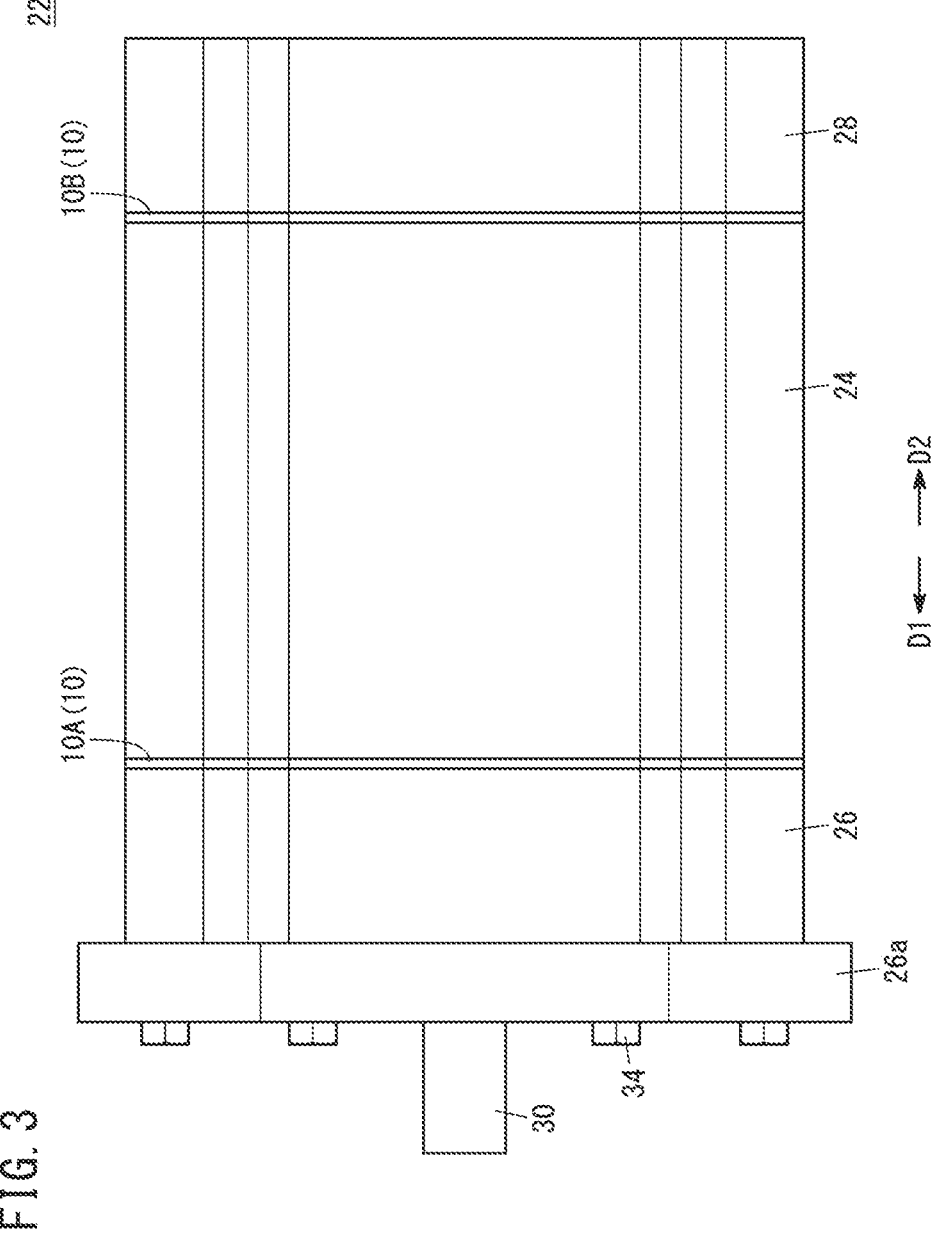
FIG. 3 is a side view of a motor according to the embodiment.

FIG. 3 is a side view of the motor 22 according to the embodiment. FIG. 4 is an exploded perspective view of the motor 22 shown in FIG. 3.

Next, the motor 22 which is equipped with the semi-metallic gasket 10 will be described. The motor 22 shown in FIG. 3 comprises the core block 24, the front side housing 26, a rear side housing 28, and a plurality of the semi-metallic gaskets 10 (10A and 10B).

The core block 24 serves as a stator of the motor 22. The core block 24 is tubular shaped. Accordingly, the core block 24 has an annular shape when viewed from the first direction D1. A shaft 30 is arranged in the interior of the tube (the annular shape) of the core block 24. The shaft 30 is a shaft member in order to output a rotational force of the motor 22.

The front side housing 26 is a case that covers the core block 24 from the first direction D1. Although illustration thereof is omitted, when viewed from the second direction D2, the front side housing 26 has an annular shape that matches the annular shape of the core block 24. The shaft 30 is inserted through the front side housing 26. As shown in FIG. 3 and FIG. 4, the front side housing 26 may include a flange (a plate shaped joint) 26a. In accordance with this feature, it becomes easy to connect the motor 22 to another mechanical device.

The core block 24 and the front side housing 26 are connected to each other by the plurality of screws 34. More specifically, the core block 24 includes a plurality of insertion holes 24a. The front side housing 26 has a plurality of insertion holes 26b. The plurality of screws 34 are inserted through the plurality of the insertion holes 24a and the plurality of the insertion holes 26b. Consequently, the core block 24 and the front side housing 26 are connected.

A semi-metallic gasket 10A is arranged between the front side housing 26 and the core block 24. The semi-metallic gasket 10A firmly seals the gap between the front side housing 26 and the core block 24. Moreover, the plurality of the screws 34 are inserted through the plurality of the holes 16a in the semi-metallic gasket 10A. Accordingly, the semi-metallic gasket 10A does not obstruct the connection between the front side housing 26 and the core block 24.

The rear side housing 28 is a case that covers the core block 24 from the second direction D2. Although illustration thereof is omitted, when viewed from the first direction D1, the rear side housing 28 has an annular shape that matches the annular shape of the core block 24. Although illustration of this feature is also omitted, the rear side housing 28 is connected by the plurality of screws 34 to a portion of the core block 24 that faces in the second direction D2.

The semi-metallic gasket 10B is arranged between the rear side housing 28 and the core block 24. The semi-metallic gasket 10B is similar to the semi-metallic gasket 10A, with the exception of being arranged between the rear side housing 28 and the core block 24. Accordingly, description of the semi-metallic gasket 10B will be omitted.

The foregoing is an exemplary configuration of the motor 22. The motor 22 is equipped with the semi-metallic gasket 10 which is easily held under suction by the suction hand. Accordingly, for the robot that is equipped with the suction hand, the motor 22 is easily assembled. Moreover, it should be noted that the location to the semi-metallic gasket 10 is attached is not particularly limited, insofar as it is a location in the motor 22 that needs to be sealed.

Finally, a description will be given of a sealing method (a method of sealing the motor 22). This sealing method is a method for the purpose of obtaining the motor 22 illustrated in FIG. 3 and FIG. 4. Hereinafter, for purposes of illustration, a case will be described in which a gap between the front side housing 26 and the core block 24 is sealed by the semi-metallic gasket 10A.

Figure 5:
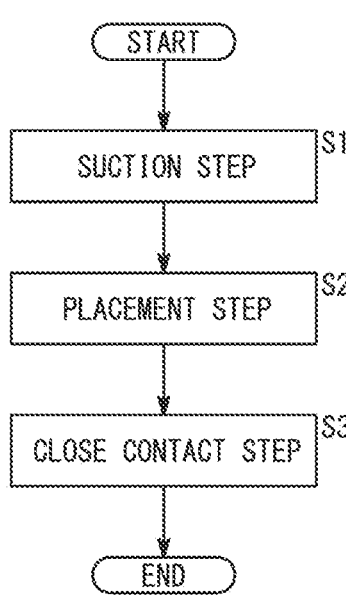
FIG. 5 is a flowchart illustrating a process flow of a motor sealing method according to the embodiment.

FIG. 5 is a flowchart illustrating a process flow of a sealing method for sealing the motor 22 according to the embodiment.

The sealing method includes a suction step S1, a placement step S2, and a close contact step S3. As illustrated in FIG. 5, the suction step S1, the placement step S2, and the close contact step S3 are executed sequentially in this order.

First, in the suction step S1, the suction hand of the robot holds the semi-metallic gasket 10A under suction. The suction hand can easily hold the semi-metallic gasket 10A under suction by sucking the plurality of the portions to be sucked 14.

Next, in the placement step S2, the suction hand places the semi-metallic gasket 10A on the core block (the first member) 24.

In the close contact step S3, for example, a pressing machine presses the front side housing (the second member) 26 toward the core block 24 (in the second direction D2) from a side opposite to a side where the core block 24 is disposed. Consequently, the front side housing 26 and the semi-metallic gasket 10A are placed in close contact with each other. Further, the semi-metallic gasket 10A and the core block 24 are placed in close contact with each other. The pressing machine applies, to the front side housing 26, a force of a degree sufficient to squash the projecting portion 12a. Consequently, the gap between the front side housing 26 and the core block 24 is firmly sealed by the semi-metallic gasket 10A. Moreover, a means other than the pressing machine may be used, insofar as it is capable of achieving close contact between the front side housing 26 and the semi-metallic gasket 10A, as well as close contact between the semi-metallic gasket 10A and the core block 24.

The foregoing describes the process flow of the sealing method illustrated in FIG. 5. After the close contact step S3, the front side housing 26 and the core block 24 are connected together by the plurality of screws 34.

In the placement step S2, the semi-metallic gasket 10A may be placed on the front side housing 26. In this case, in the close contact step S3, the core block 24 is placed in close contact with the semi-metallic gasket 10A from a side opposite to a side where the front side housing 26 is disposed.

Moreover, in the case of sealing a gap between the core block 24 and the rear side housing 28 by the semi-metallic gasket 10B, the above-described sealing method is performed with the rear side housing 28 serving as the second member.

Exemplary Modifications

Hereinafter, concerning exemplary modifications according to the embodiment, some specific examples thereof will be disclosed. Moreover, the same reference numerals as those of the embodiment will be used to describe the constituent elements that have already been described in the embodiment. Further, explanations that overlap with those of the embodiment will be omitted insofar as possible.

Exemplary Modification 1

Figure 6:
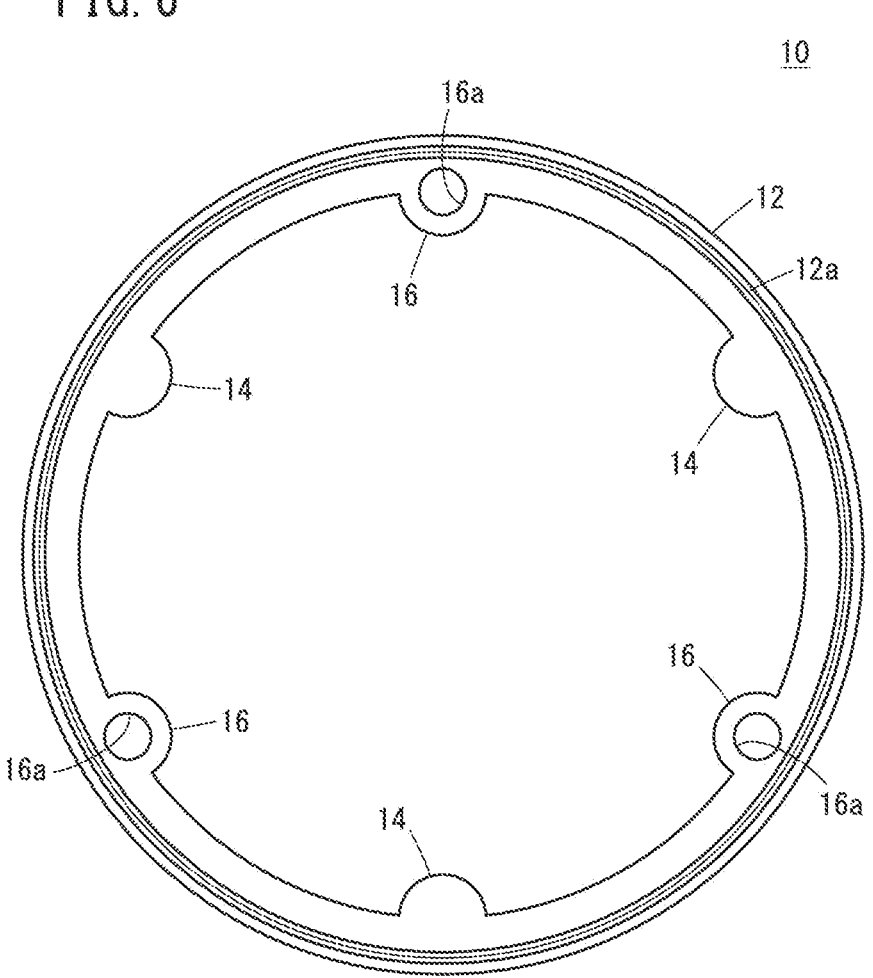
FIG. 6 is a front view of a semi-metallic gasket according to a first exemplary modification.
Figure 7:
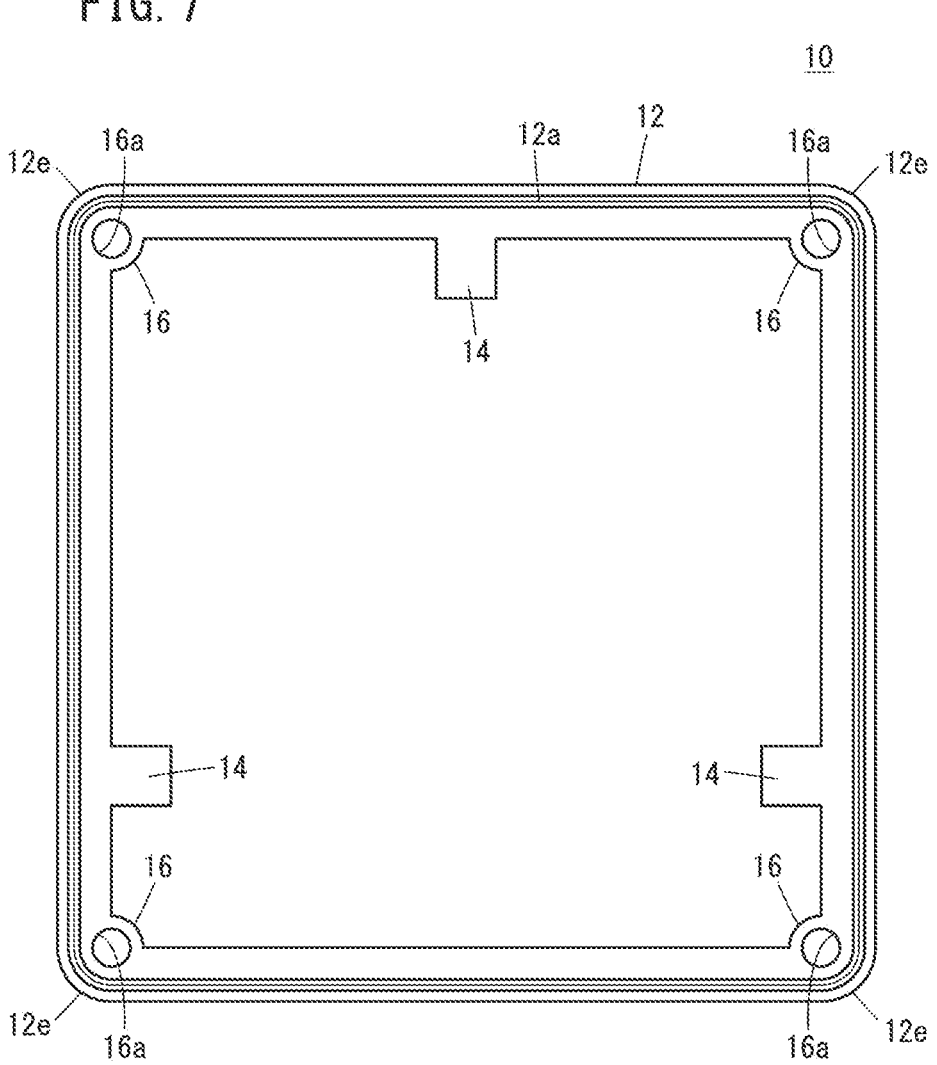
FIG. 7 is a front view of another semi-metallic gasket according to the first exemplary modification.

FIG. 6 is a front view of the semi-metallic gasket 10 according to a first exemplary modification. FIG. 7 is a front view of another semi-metallic gasket 10 according to the first exemplary modification.

As shown in each of FIG. 6 and FIG. 7, the shape of the semi-metallic gasket 10 is not limited to the example illustrated in the embodiment (FIG. 1). In FIG. 6, an example is illustrated of the semi-metallic gasket 10 having a bead portion 12 of a circular annular shape when viewed from the front, and a projecting portion 12a having a circular annular shape when viewed from the front. On the other hand, in FIG. 7, an example is illustrated of the semi-metallic gasket 10 having a bead portion 12 of a substantially rectangular shape when viewed from the front, and a projecting portion 12a of a substantially rectangular shape when viewed from the front.

Exemplary Modification 2

Each of the plurality of the portions to be sucked 14 as described in the embodiment extends along the fourth direction D4 from the bead portion 12. Without being limited to this feature, each of the plurality of the portions to be sucked 14 may extend along the third direction D3 from the bead portion 12.

Exemplary Modification 3

The projecting portion 12a of the bead portion 12 may project out in the second direction D2. In that case, at a time when the bead portion 12 is placed in close contact with the first member (the core block 24 in FIG. 3), the projecting portion 12a is pressed particularly strongly against the first member. Even in this case, the surface pressure that the bead portion 12 receives can be particularly increased at the projecting portion 12a.

Exemplary Modification 4

The number of the portions to be sucked 14 that are provided on the semi-metallic gasket 10 is not limited to being a plurality of members, and may be a single member.

Exemplary Modification 5

In the embodiment, a description has been given to the effect that the location where the semi-metallic gasket 10 is attached is not particularly limited. In regard to this feature, in the present exemplary modification, a specific example thereof will be presented.

For example, a connector may be connected to the rear side housing 28. In this case, the semi-metallic gasket 10 may seal a gap between the rear side housing 28 and the connector. In this case, one of the rear side housing 28 and the connector serves as the first member. Further, the other remaining one thereof serves as the second member.

Further, for example, a bracket may be connected to the rear side housing 28. In this case, the semi-metallic gasket 10 may seal a gap between the rear side housing 28 and the bracket. In this case, one of the rear side housing 28 and the bracket serves as the first member. Further, the other remaining one thereof serves as the second member.

Furthermore, an encoder may be connected to the bracket. In this case, the semi-metallic gasket 10 may seal a gap between the bracket and the encoder. In this case, one of the bracket and the encoder serves as the first member. Further, the other remaining one thereof serves as the second member.

Exemplary Modification 6

The number of the semi-metallic gaskets 10 provided in the motor 22 may be changed as necessary. For example, the number of the semi-metallic gaskets 10 provided in the motor 22 may be a single member.

Moreover, the present invention is not limited to the above-described embodiment and the exemplary modifications, and can assume various configurations without departing from the essence and gist of the present invention.

Inventions Capable of being Obtained from the Embodiment

The inventions capable of being grasped from the above-described embodiment and the exemplary modifications will be described below.

<First Invention>

The first invention is characterized by the semi-metallic gasket (10) provided in the motor (22) being equipped with the first member (24, 26, 28) and the second member (24, 26, 28) each having an annular shaped cross section. The semi-metallic gasket seals a gap between the first member (24, 26, 28) and the second member (24, 26, 28), the semi-metallic gasket including the annular shaped bead portion (12) made of a semi-metallic material, and the portion to be sucked (14) that is held under suction by the suction hand of the robot, wherein the portion to be sucked (14) projects out from the bead portion (12) along the width direction of the bead portion (12).

In accordance with such features, the semi-metallic gasket (10) is provided which is easily held under suction by the suction hand.

The annular shape of the bead portion (12) may be point-symmetrical with respect to the center point (P) of the annular shape of the bead portion (12). In accordance with this feature, it becomes easier for the bead portion (12) to receive a uniform surface pressure.

The first member (24, 26, 28) and the second member (24, 26, 28) may be connected by a plurality of the connecting members (34). The semi-metallic gasket may further include the plurality of the insertion portions (16) each including the hole (16a) into which each of the plurality of the connecting members (34) is inserted. The plurality of the insertion portions (16) may be provided in the bead portion (12) in point-symmetry with respect to the center point (P). In accordance with such features, it becomes easier for a large surface pressure to be uniformly applied to the bead portion (12).

In the semi-metallic gasket (10), at least two of the portions to be sucked (14) may be provided, and the two of the portions to be sucked (14) may be arranged in a manner so as to sandwich the imaginary straight line (L) passing through one point on the annular shaped bead portion (12) and the center point (P). In accordance with this feature, it becomes easier to lift up the semi-metallic gasket (10) with the suction hand in good balance (in a horizontal state).

<Second Invention>

The second invention is characterized by the motor (22) in which the semi-metallic gasket (10) according to the first invention is provided. The motor includes the first member (24, 26, 28) and the second member (24, 26, 28), and a gap between the first member (24, 26, 28) and the second member (24, 26, 28) is sealed by the semi-metallic gasket (10).

In accordance with this feature, the motor (22) is provided which is easy for the robot to assemble.

<Third Invention>

The third invention is characterized by the motor sealing method for, by using the semi-metallic gasket (10) according to the first invention, sealing a gap between the first member (24, 26, 28) and the second member (24, 26, 28) provided in the motor (22). The motor sealing method includes the suction step (S1) of holding the portion to be sucked (14) of the semi-metallic gasket (10), under suction by the suction hand, the placement step (S2) of placing the semi-metallic gasket (10) held under suction by the suction hand, on the first member (24, 26, 28) of the motor (22), and the close contact step (S3) of bringing the second member (24, 26, 28) of the motor (22) into close contact with the semi-metallic gasket (10) from a side opposite to a side where the first member (24, 26, 28) is disposed.

In accordance with such features, the sealing method that easily enables automation is provided.

REFERENCE SIGNS LIST

10: semi-metallic gasket
12: bead portion
14: portion to be sucked
16: insertion portion
16*a*: hole
22: motor
24: core block (first member, second member)
26: front side housing (first member, second member)
28: rear side housing (first member, second member)

The invention claimed is:

1. A semi-metallic gasket provided in a motor equipped with a first member and a second member each having an annular shaped cross section, the semi-metallic gasket being configured to seal a gap between the first member and the second member, the semi-metallic gasket comprising:
   a bead portion having an annular shape and made of a semi-metallic material; and
   at least two portions to be sucked configured to be held under suction by a suction hand of a robot, wherein the portion to be sucked projects out from the bead portion along a width direction of the bead portion,
   the annular shape of the bead portion is point-symmetrical with respect to a center point of the annular shape of the bead portion, and
   the two portions to be sucked are arranged in a manner so as to sandwich an imaginary straight line passing through one point on the bead portion having the annular shape and the center point.

2. The semi-metallic gasket according to claim 1, wherein the first member and the second member are connected by a plurality of connecting members,
   the semi-metallic gasket further comprising a plurality of insertion portions each including a hole into which each of the plurality of connecting members is inserted,
   wherein the plurality of insertion portions are provided in the bead portion in point-symmetry with respect to the center point.

3. A motor in which the semi-metallic gasket according to claim 1 is provided, the motor comprising the first member and the second member,
   wherein a gap between the first member and the second member is sealed by the semi-metallic gasket.

4. A motor sealing method for, by using a semi-metallic gasket, sealing a gap between a first member and a second member provided in a motor, wherein the first member and the second member each have an annular shaped cross section,
   the semi-metallic gasket including:
   a bead portion having an annular shape and made of a semi-metallic material; and
   a portion to be sucked configured to be held under suction by a suction hand of a robot,
   wherein the portion to be sucked projects out from the bead portion along a width direction of the bead portion,
   the motor sealing method comprising:
   a suction step of holding the portion to be sucked of the semi-metallic gasket, under suction by the suction hand;
   a placement step of placing the semi-metallic gasket held under suction by the suction hand, on the first member of the motor; and
   a close contact step of bringing the second member of the motor into close contact with the semi-metallic gasket from a side opposite to a side where the first member is disposed.

* * * * *